(12) United States Patent
Hirade et al.

(10) Patent No.: US 10,544,321 B2
(45) Date of Patent: Jan. 28, 2020

(54) INK, INKJET RECORDING METHOD, INK CARTRIDGE, AND IMAGE RECORDING DEVICE

(71) Applicants: Tomohiro Hirade, Kanagawa (JP); Hisashi Habashi, Kanagawa (JP)

(72) Inventors: Tomohiro Hirade, Kanagawa (JP); Hisashi Habashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 299 days.

(21) Appl. No.: 15/613,390

(22) Filed: Jun. 5, 2017

(65) Prior Publication Data
US 2017/0349772 A1   Dec. 7, 2017

(30) Foreign Application Priority Data

Jun. 6, 2016 (JP) .................... 2016-112891
Apr. 6, 2017 (JP) .................... 2017-075948

(51) Int. Cl.
C09D 11/38 (2014.01)
C09D 11/322 (2014.01)
C08K 7/24 (2006.01)
C08K 7/26 (2006.01)
C08K 3/26 (2006.01)
B41M 7/00 (2006.01)

(52) U.S. Cl.
CPC ............ C09D 11/38 (2013.01); C08K 3/26 (2013.01); C08K 7/24 (2013.01); C09D 11/322 (2013.01); *C08K 2003/265* (2013.01)

(58) Field of Classification Search
None
See application file for complete search history.

(56) References Cited

U.S. PATENT DOCUMENTS

| 2007/0191509 | A1* | 8/2007 | Kobayashi | C09D 11/36 523/160 |
|---|---|---|---|---|
| 2015/0184010 | A1 | 7/2015 | Okada et al. | |
| 2016/0152845 | A1 | 6/2016 | Okada et al. | |
| 2016/0347962 | A1 | 12/2016 | Okada et al. | |
| 2019/0100667 | A1* | 4/2019 | Miyaake | C09D 11/40 |

FOREIGN PATENT DOCUMENTS

| JP | 2005-263550 | 9/2005 |
|---|---|---|
| JP | 2007-211176 | 8/2007 |
| JP | 2012-007089 | 1/2012 |
| JP | 2014-122310 | 7/2014 |
| JP | 2015-174868 | 10/2015 |
| WO | WO2012-121130 A1 | 9/2012 |

OTHER PUBLICATIONS

English translation of JP 2005/263550, Sep. 2005; 15 pages.*
English translation of JP 2014/122310, Jul. 2014; 99 pages.*
English translation of JP 2015/174868, Oct. 2015; 49 pages.*
English translation of JP 5810362, Jul. 2014; 35 pages.*
English translation of JP 2012/007089, Jan. 2012; 30 pages.*

* cited by examiner

*Primary Examiner* — Helene Klemanski
(74) *Attorney, Agent, or Firm* — Oblon, McClelland, Maier & Neustadt, L.L.P.

(57) ABSTRACT

An ink includes a volatile solvent, an inorganic hollow particle, and a calcium ion, wherein the calcium ion has a proportion of from 0.5 to 250 ppm in the ink and the inorganic hollow particle has a 50 percent cumulative particle diameter of from 50 to 350 nm.

14 Claims, 2 Drawing Sheets

INK, INKJET RECORDING METHOD, INK CARTRIDGE, AND IMAGE RECORDING DEVICE

CROSS-REFERENCE TO RELATED APPLICATIONS

This patent application is based on and claims priority pursuant to 35 U.S.C. § 119 to Japanese Patent Application Nos. 2016-112891 and 2017-075948, filed on Jun. 6, 2016 and Apr. 6, 2017, respectively, in the Japan Patent Office, the entire disclosure of which is hereby incorporated by reference herein.

BACKGROUND

Technical Field

The present disclosure relates to an ink, an inkjet recording method, an ink cartridge, and an inkjet recording device.

Description of the Related Art

Since inkjet printers are relatively quiet, enjoy low running costs, and are capable of printing color images with ease, they are now widely used at home as an output device of digital signals. In recent years, inkjet technologies have been appealing in business fields of, for example, display, posters, and signboards in addition to home use.

However, recording media for industrial use have a wide range of from paper to transparent articles to colored articles. When depicting white on these media or coloring them with color ink, it is required to sufficiently conceal transparency or color of the media with ink. White ink is used to cover such transparent or colored media with white color. In addition, when color ink is used, in order to use the same color ink for use in typical images, white ink is printed on a recording medium as backdrop of the color ink to improve coloring.

As the pigment for white ink, titanium dioxide, which has excellent concealing property and coloring, is widely used. To obtain a high level of concealment using titanium dioxide, it is required to obtain particles having a particle size distribution of 200 to 300 nm to scatter visible light. However, titanium dioxide tends to settle out since the specific gravity is relatively large in comparison with an ink medium. Moreover, titanium dioxide settles out more easily in a low viscous ink such as aqueous ink or solvent-based ink. In addition, if titanium dioxide settles out, it is difficult to make re-dispersion to form a closest packing structure.

To deal with such issues, ink using hollow particles have been developed. Since an ink medium is present in the hollow portion of hollow particles in ink, specific gravity thereof decreases in appearance and the hollow particle does not easily settle out. Moreover, concealment by hollow particles is obtained by utilizing the difference of refractive index between hollow shells and the hollow portion from which the ink component is drawn out after applied film is dried.

For example, ink having white hollow particles has been proposed. However, the white hollow particle has weak chemical resistance so that it is not possible to maintain the hollow structure depending on solubility of a solvent in an ink component or drying conditions after printing. For this reason, the hollow particle becomes transparent so that desired concealment is not obtained.

Moreover, radiation-curable ink has been proposed which includes inorganic or inorganic-organic mixed hollow particles as white pigment. However, in the case of such a curable ink, the ink cures while the polymerizable components remain in the hollow portion of the hollow particle so that desired concealing property is not obtained.

Furthermore, ink including organic particles having hollow structure and inorganic particles having hollow structure has been proposed. However, like the white hollow particle mentioned above, the organic particle having a hollow structure has weak chemical resistance so that it is not possible to maintain the hollow structure depending on solubility of a solvent in an ink component or drying conditions after printing. For this reason, the hollow particle becomes transparent and naturally desired concealment is not obtained.

SUMMARY

According to an embodiment of the present invention, provided is an improved ink which includes a volatile solvent, an inorganic hollow particle, and a calcium ion, wherein the calcium ion has a proportion of from 0.5 to 250 ppm in the ink and the inorganic hollow particle has a 50 percent cumulative particle diameter of from 50 to 350 nm.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
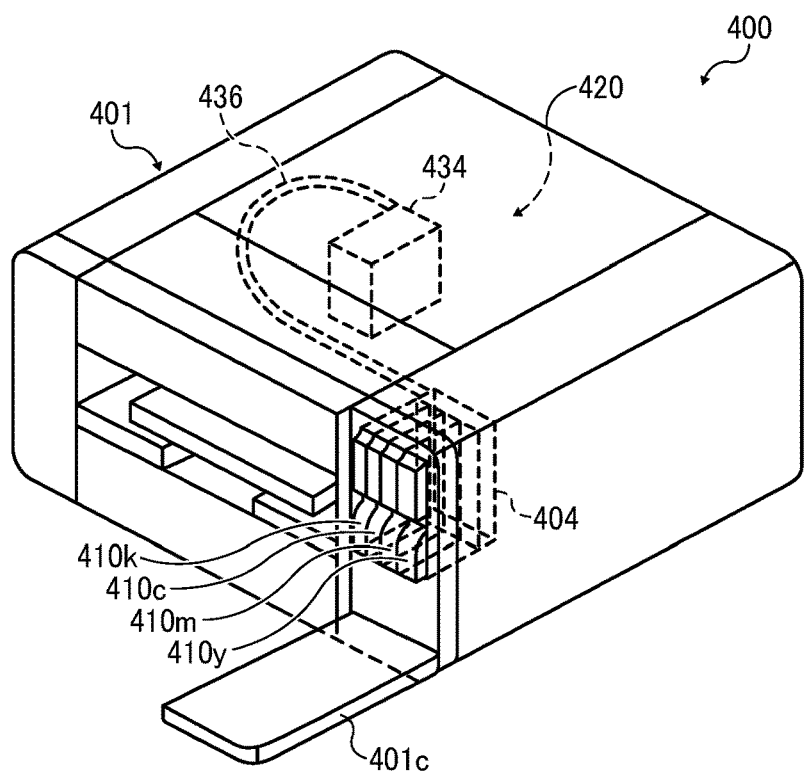
FIG. 1 is a diagram illustrating a perspective view of a recording device.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The present disclosure relates to the inkjet ink described in the following 1 and also includes the following 2 to 11 as aspects of the present disclosure.

1. An ink includes a volatile solvent, an inorganic hollow particle and a calcium ion. The calcium ion has a proportion of from 0.5 to 250 ppm in the ink and the inorganic hollow particle has a 50 percent cumulative particle diameter of from 50 to 350 nm 2. The ink of 1 mentioned above, wherein the calcium ion has a proportion of from 0.5 to 50 ppm in the ink.

3. The ink of 2 mentioned above, wherein the calcium ion has a proportion of from 0.5 to 30 ppm in the ink.

4. The ink of any one of 1 to 3 mentioned above, wherein the volatile solvent includes a non-polymerizable solvent and has a boiling point of 260 degrees C. or lower.

5. The ink of any one of 1 to 4 mentioned above, wherein the volatile solvent includes water or a water-soluble organic solvent.

6. The ink of any one of 1 to 4 mentioned above, wherein the volatile solvent includes an organic solvent.

7. The ink of any one of 1 to 6 mentioned above, wherein the inorganic hollow particle has a shell thickness of from 4 to 20 nm.

8. The ink of any one of 1 to 7 mentioned above, wherein the luminous difference ΔL* of a solid image of the ink of 50 mm×50 mm formed on a polyethylene terephthalate (PET) film satisfies the following relation:

$$\Delta L^* = (L^* 100 \text{ degrees C.}) - (L^* 50 \text{ degrees C.})$$

$$-10 \leq \Delta L^* \leq 10$$

where L*50 degrees C. and L*100 degrees C. respectively represent a luminous L* after the solid image is dried in a constant temperature tank at 50 degrees C. and 100 degrees C. for one hour.

9. An inkjet recording method includes jetting the ink of any one of 1 to 8 mentioned above to a recording medium and drying the ink at 50 to 200 degrees C.

10. An ink cartridge includes a container and the ink of any one of 1 to 8 mentioned above accommodated in the container.

11. An image recording device includes an ink cartridge accommodating the ink of any one of 1 to 8 mentioned above and a recording head to discharge the ink.

The ink for use in the present disclosure includes a volatile solvent, inorganic hollow particles, and calcium ions, wherein the calcium ions have a proportion of from 0.5 to 250 ppm in the ink and the inorganic hollow particles have a 50 percent cumulative particle diameter of from 50 to 350 nm When the proportion of the calcium ion in ink and the 50 percent cumulative particle diameter of the inorganic hollow particles in the ink are within the ranges specified above, the ink has a good dispersion stability, concealing property, and chemical resistance.

Inorganic Hollow Particle

The inorganic hollow particle has no particular limit. For example, oxides, nitrides, and oxynitride of titanium, silicon, aluminum, zirconium, and strontium. In terms of concealing property of applied film, titanium oxide is preferable. Also, other materials such as silicone oxide can be utilized since scattering at the shell corresponding to the outer crust of hollow particle and the hollow portion inside is obtained in addition to the scattering at the surface of the hollow particle. Moreover, in terms of sedimentation in ink, silicon oxide is preferable because it has a relatively small specific gravity as the inorganic hollow particle. Furthermore, it is relatively easy to control the thickness of the shell and the hollow diameter of the hollow particle of silicon oxide. Therefore, silicon oxide is preferable as the inorganic hollow particle.

It is preferable that the inorganic hollow particle have a specific gravity close to that of liquid ink in order not to precipitate, surface, or be separated in the ink. Therefore, the inorganic hollow particle preferably has a shell thickness of from 4 to 20 nm and more preferably from 6 to 18 nm. When the shell thickness is 4 nm or greater, it is possible to prevent collapse of the hollow structure ascribable to energy applied during dispersion process and settling out in ink. Also, good concealing property is obtained. When the shell thickness is 20 nm or less, the specific gravity of the inorganic hollow particle can be maintained small, thereby preventing sedimentation in ink. In addition, it is preferable that the ratio (inner diameter/outer diameter) of the inner diameter (hollow portion diameter) to the outer diameter (primary particle diameter) of the inorganic hollow particle be from 0.75 to 0.95. When the ratio is 0.75 or greater, scattering between the hollow shell and the hollow portion inside thereof is sufficient, which leads to good concealing property. Moreover, the inorganic hollow particle does not easily settle out due to the hollow portion inside. When the ratio is 0.95 or less, the hollow shell has good strength so that the particle can maintain the structure against energy burden applied during dispersion. For this reason, the particle has good concealing property and dispersion stability by which sedimentation does not easily occur.

It is preferable that the inorganic hollow particle have a number average primary particle diameter of from 20 to less than 200 nm. When the number average primary particle diameter is 20 nm or greater, concealing property of applied film can be secured due to scattering caused by the hollow shell and the hollow portion inside. When the number average primary particle diameter is less than 200 nm, the particle does not easily settle out in ink so that high level of dispersion stability can be expected. When the number average primary particle diameter of the inorganic hollow particle is from 50 to 100 nm, it is suitable to strike a balance between concealing property and good dispersion stability. Diameters along a certain direction between two parallel lines sandwiching 200 to 500 primary particles with a magnification power of 30,000 are measured utilizing a transmission electron microscope (JEM-2100F, manufactured by JEOL Ltd.) to obtain the average of the cumulative distribution to obtain the number average primary particle diameter and the shell thickness.

The inorganic hollow particle in ink has a 50 percent cumulative volume particle diameter (D50) of from 50 to 350 nm. It is preferably 68 to 350 nm and more preferably from 80 to 260 nm. When the 50 percent cumulative volume particle diameter (D50) is 50 nm or greater, concealing property of applied film is obtained. When the 50 percent cumulative volume particle diameter (D50) is 350 nm or less, it is possible to suppress an increase of the specific gravity on appearance by bonding solvent between particles due to secondary agglomeration, which contributes to good dispersion stability to prevent sedimentation. The 50 percent cumulative volume particle diameter (D50) of an ink composition represents the secondary particle diameter in the ink composition. Ink is diluted with a volatile solvent used as a dispersion medium until about 100 to about 1,000 times to measure the 50 percent cumulative volume particle diameter0 (D50) utilizing a particle size distributor (UPA-150EX, manufactured by NIKKISO CO., LTD.). In addition, the 50 percent cumulative volume particle diameter (D50) of ink is obtained by measuring ink itself and corresponds to 50 percent cumulative volume particle diameter (D50) of particulate substances (specifically, liquid dispersion including inorganic hollow particles) in the ink.

The proportion of the inorganic hollow particle in ink is preferably from 3 to 12 percent by mass and more preferably from 4.5 to 10 percent by mass. When the proportion is 3 percent by mass or greater, concealing property and abrasion resistance become sufficient. When the percent by mass is 12 percent by mass or less, concentration of applied film becomes sufficient and good discharging stability can be obtained.

When the inorganic hollow particle is made of silicon oxide (hereinafter also referred to as hollow silica particle), the method of manufacturing the inorganic hollow particle is not limited. Known manufacturing methods can be used. For example, as disclosed in WO2012/121130 and Japanese Unexamined Japanese Patent Application Publication No. 2005-263550, using calcium carbonate as a core material, alkoxysilane is formed on the surface of calcium carbonate under the presence of a basic catalyst to obtain silica. Thereafter, hollow silica particles are obtained according to a method of adding an acid to dissolve calcium carbonate. In the dissolution process of calcium carbonate, pH is controlled to obtain hollow silica particles having less secondary agglomeration. Specifically, it is to avoid the isoelectric point of silica. Silica has an isoelectric point at around pH 2 to 3. If pH is too low when calcium carbonate is dissolved, electrostatic repulsion is lost, which leads to agglomeration. Therefore, in order to dissolve calcium carbonate, pH 4 to 5 is preferable.

In the present disclosure, the proportion of calcium ion in ink is required to be 0.5 to 250 ppm and preferably from 0.5 to 50 ppm, and more preferably from 0.5 to 30 ppm. When the proportion is less than 0.5 ppm, efficiency of refining process significantly lowers. When the proportion surpasses 250 ppm, none of dispersion stability, concealing property, and chemical resistance is satisfactory.

The proportion of calcium ion in ink can be quantified by using Inductively Coupled Plasma (ICP) emission spectrometer (ICPE-9000, manufactured by Shimadzu Corporation), etc. The proportion of calcium ion changes depending on the number of liquid passing of ultrafiltration membrane at manufacturing stage.

When using the hollow silica particle for the ink of the present disclosure, it is desirable not to use dried powder hollow silica particles but a liquid dispersion of hollow silica particles produced during the manufacturing process thereof. If a liquid dispersion of hollow silica particles is used, strong agglomeration of particles during drying can be prevented. For this reason, the hollow silica particle can be dispersed in ink again without breaking the hollow structure within the range of the 50 percent cumulative volume particle diameter (D50) of the inorganic hollow particle regulated in the present disclosure.

The proportion of calcium ion in ink depends on the amount of acid at the time of dissolution of core particles in particle manufacturing process if using hollow silica particles. The proportion also depends on the manufacturing condition if other types of inorganic hollow particles are used.

When dispersing inorganic hollow particles in ink, it is desirable to add a polymer dispersant. Examples of the polymer dispersant are copolymers of α-olefin-maleic anhydride, styrene-(meth)acrylic copolymer, water-soluble polyurethane resins, and water-soluble polyester resins. These can be used alone or in combination. When using a polymer dispersant, steric repulsion effect accompanied by dispersant adsorption can be improved so that good dispersion stability can be obtained. The polymer dispersant has a weight average molecular weight of 1,000 or greater.

The proportion of the polymer dispersant is preferably 10 to 60 percent by mass and more preferably 15 to 50 percent by mass to the inorganic hollow particle. When the proportion is 10 percent by mass or greater, dispersibility can be secured due to the steric repulsion effect of the polymer dispersant adsorbed to inorganic hollow particles. When the proportion is 60 percent by mass or less, the amount of polymer dispersant not adsorbed to inorganic hollow particles is small so that ink can be less viscous. Moreover, since the amount of polymer dispersant not adsorbed is small, an increase of thixotropy is suppressed and filtration liquid passing property and dischargeability ameliorate.

Volatile Solvent

The ink of the present disclosure includes a volatile solvent. The volatile solvent is preferably a non-polymerizable solvent having no polymerizable functional group and more preferably, it does not remain in an inorganic hollow particle at the time of drying applied film. When the volatile solvent is water or a water-soluble organic solvent, it can be used as an aqueous ink. When the volatile solvent is a water-soluble organic solvent, it can be used as a solvent ink. However, volatile organic compound (VOC) problems draw concerns so that aqueous ink capable of reducing production of VOC is widely desired. VOC is a generic term for organic compounds which easily evaporates into air at ordinary temperatures and pressures. However, in the present disclosure, the volatile solvent has a boiling point of 300 degrees C. or lower and volatilizes when heated on a recording medium.

The ink of the present disclosure obtains concealing property utilizing scattering of the shell of inorganic hollow particle and hollow portion inside in addition to scattering at the surface of particles as described above. Therefore, if the ink component remains inside the inorganic hollow particle after drying the applied film, concealing property of the applied film deteriorates. From this point of view, the boiling point of the volatile solvent is preferably 260 degrees C. or lower.

Aqueous Ink

Examples of the water-soluble organic solvent for use in the aqueous ink are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylform amide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use a water-soluble organic solvent having a boiling point of 260 degrees C. or lower.

Of these, polyol compounds having eight or more carbon atoms and glycol ether compounds are suitable.

Specific examples of the polyol compounds having eight or more carbon atoms include, but are not limited to, 2-ethyl-1,3-hexanediol and 2,2,4-trimethyl-1,3-pentanediol.

Preferred specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The proportion of the water-soluble organic solvent in ink has no particular limit and can be suitably selected to suit to a particular application.

In terms of the drying property and discharging reliability of the ink, the proportion is preferably 10 to 60 percent by mass and more preferably 20 to 60 percent by mass.

The proportion of water in the aqueous ink is not particularly limited and can be suitably selected to suit to a particular application. For example, in terms of the drying property and discharging reliability of the ink, the proportion is preferably 10 to 90 percent by mass and more preferably 20 to 60 percent by mass.

Solvent Ink

Specific examples of the organic solvent for use in the solvent ink include, but are not limited to, glycol monoacetates such as ethylene glycol monomethylether acetate, ethylene glycol monoethylether acetate, ethylene glycol monobutylether acetate, diethylene glycol monomethylether acetate, diethylene glycol monoethylether acetate, diethylene glycol monobutylether acetate, propylene glycol monomethylether acetate, dipropylene glycol monomethylether acetate, ethylene glycol monomethylether propionate, ethylene glycol monoethylether propionate, ethylene glycol monobutylether propionate, diethylene glycol monomethylether propionate, diethylene glycol monoethylether propionate, diethylene glycol monobutylether propionate, propylene glycol monomethylether propionate, dipropylene glycol monomethylether propionate, ethylene glycol monomethylether butylate, ethylene glycol monoethylether butylate, ethylene glycol monobutylether butylate, diethylene glycol monomethylether butylate, diethylene glycol monoethylether butylate, diethylene glycol monobutylether butylate, propylene glycol monomethylether butylate, and dipropylene glycol monomethylether butylate; glycol diacetates such as ethylene glycol diacetate, diethylene glycol diacetate, propylene glycol diacetate, dipropylene glycol diacetate, ethylene glycol acetate propionate, ethylene glycol acetate butylate, ethylene glycol propionate butylate, ethylene glycol dipropionate, ethylene glycol acetate dibutylate, diethylene glycol acetate propionate, diethylene glycol acetate butylate, diethylene glycol propionate butylate, diethylene glycol dipropionate, diethylene glycol acetate dibutylate, propylene glycol acetate propionate, propylene glycol acetate butylate, propylene glycol propionate butylate, propylene glycol dipropionate, propylene glycol acetate dibutylate, dipropylene glycol acetate propionate, dipropylene glycol acetate butylate, dipropylene glycol propionate butylate, dipropylene glycol dipropionate, and dipropylene glycol acetate dibutylate; glycols such as ethylene glycol, diethylene glycol, triethylene glycol, propylene glycol, and dipropylene glycol; glycol ethers such as ethylene glycol monobutylether, propylene glycol monomethylether, propylene glycol monobutylether, propylene glycol monopropylether, diethylene glycol monoethylether, diethylene glycol monobutylether, diethylene glycol diethylether, dipropylene glycol monomethylether, dipropylene glycol monoethylether, dipropylene glycol monobutylether, triethylene glycol monomethylether, triethylene glycol monoethylether, triethylene glycol monobutylether, and tripropylene glycol monomethylether; and lactic acid esters such as methyl lactate, ethyl lactate, propyl lactate, and butyl lactate.

The proportion of the solvent contained in the solvent ink to the total amount of the ink is preferably from 60 to 95 percent by mass, more preferably 70 to 95 percent by mass, and furthermore preferably from 80 to 95 percent by mass.

In addition, the solvent ink relating to the present disclosure preferably includes no water. The solvent ink including no water can improve stability of dispersion of a pigment, suppress hydrolysis of a solvent, and reduce corrosion of a head. In the solvent ink, the proportion of water is preferably 0.5 percent by mass or less, which is typical adsorption amount.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins may be also used. It is possible to mix a resin emulsion in which resin particles are dispersed in water serving as a dispersion medium with materials such as a coloring material and an organic solvent to obtain an ink. The resin particle can be suitably synthesized or is available on the market. These can be used alone or in combination.

Additive Agent

Ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The proportion of the surfactant in ink is not particularly limited and can be suitably selected to suit to a particular application. It is preferably 0.001 to 5 percent by mass and more preferably 0.05 to 5 percent by mass in terms of enhancement of wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-on.

pH Regulator

The pH regulator has no particular limit. It is preferable to adjust the pH to 7 or higher. Specific examples include, but are not limited to, amines such as diethanol amine and triethanol amine.

The method of dispersion of ink of the present disclosure can be executed by a dispersion device using media such as ball mill, sand mill, and bead mill or a media-free dispersion device. In order to maintain the hollow structure of inorganic hollow particles during dispersion, it is preferable to use a media-free dispersion device.

In the media-free dispersion device, collision of particles against media is avoided, so that it is possible to disperse inorganic hollow particles without breaking the hollow structure. In addition, since contamination ascribable to media does not occur, fine powder and coarse powder are not produced in the system. Moreover, uniformity of the particle size distribution can be improved so that good ink dischargeability can be obtained. Examples of the media-free dispersion device are dispersion devices or ultrasonic wave dispersion devices utilizing high-speed shearing force by collision or ultrasonic wave or high speed stirring. A specific example of the dispersion device utilizing high speed shearing force is a NanoVater™ series laboratory machine (CE-008, manufactured by Yoshida kikai co., ltd.). A specific example of the ultrasonic wave dispersion device is an ultrasonic homogenizer (US-150E, manufactured by NISSEI Corporation).

The temperature of the liquid dispersion during dispersion is preferably from 5 to 60 degrees C. and more preferably from 5 to 50 degrees C.

As for the dispersion media in a dispersion device using the media, mild conditions are required to maintain the hollow structure of inorganic hollow particles. For this reason, suitable specific gravity and particle diameter are selected.

Property of Ink

The property of the ink is not particularly limited and can be suitably selected to suit to a particular application. For example, viscosity, surface tension, pH, etc, are preferable in the following ranges.

Viscosity of the ink at 25 degrees C. is preferably 5 to 30 mPa·s and more preferably 5 to 25 mPa·s to improve print density and text quality and obtain good dischargeability. Viscosity can be measured by, for example, a rotatory viscometer (RE-80L, manufactured by TOKI SANGYO CO., LID.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of suitable leveling of ink on a recording medium and making the drying time of the ink shorter.

The pH of the ink is preferably 7 to 12 and more preferably 8 to 11 in terms of prevention of corrosion of metal materials in contact with the ink.

Recording Medium

The recording medium is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less from the start of the contact until 30 msec$^{1/2}$ thereafter according to Bristow method.

For example, plastic films of polyvinyl chloride resin, polyethylene terephthalate (PET), polypropylene, polyethylene, and polycarbonate film are suitably used for the non-permeating substrate.

The recording medium is not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

For example, in the case of polyethylene terephthalate (PET) film, an article having a thickness of 100 μm with a total light transmittance of 80 percent or greater is preferable.

Ink Cartridge

The ink cartridge of the present disclosure has an ink accommodating unit to accommodate the ink of the present disclosure and other optional suitably-selected members.

There is no specific limit to the ink accommodating unit. It is possible to select any form, any structure, any size, and any material. For example, a container having at least an ink bag formed of aluminum laminate film, a resin film, etc. can be suitably used.

Next, the ink cartridge is described in detail with reference to FIGS. 3 and 4.

Figure 3:
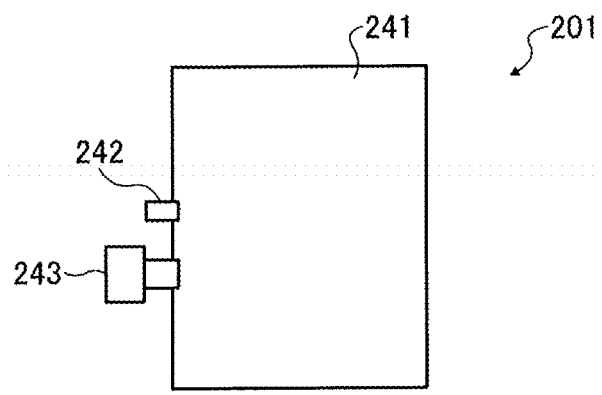
FIG. 3 is a schematic diagram illustrating an example of the ink cartridge according to an embodiment of the present invention.
Figure 4:
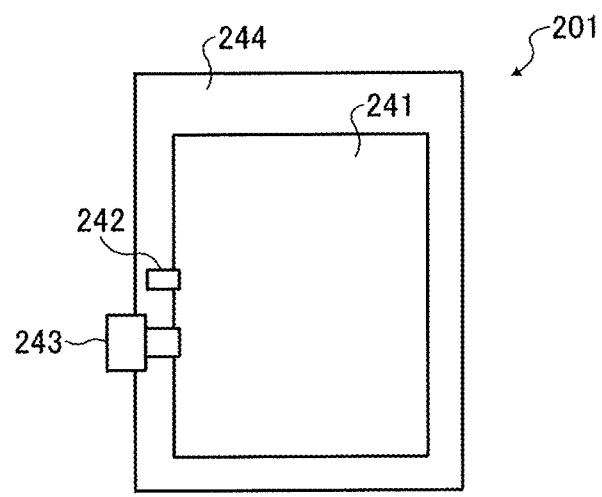
FIG. 4 is a schematic diagram illustrating a variation example of the ink cartridge illustrated in FIG. 3.

FIG. 3 is a schematic diagram illustrating an example of the ink cartridge. FIG. 4 is a variation example of the ink cartridge illustrated in FIG. 3.

As illustrated in FIG. 3, an ink bag 241 is filled with the ink of the present disclosure for inkjet recording described above from an ink inlet 242. Subsequent to evacuation of air, the ink inlet 242 is closed by fusion. When the ink is used, a needle provided to an inkjet recording device thrusts an ink outlet 243 made of rubber in order that the ink is provided to the inkjet recording device.

The ink bag 241 is formed of a packaging material such as aluminum laminate film having no air permeability. The ink bag 241 is accommodated in a cartridge housing 244 made of plastic as illustrated in FIG. 4 and detachably attachable to various inkjet recording devices.

An ink cartridge 201 accommodates the ink of the present disclosure for inkjet recording and can be used by detachably attaching to various inkjet recording devices and in particular preferably the inkjet recording device described later.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device, etc.).

In the present disclosure, the recording device and the recording method respectively represent a device capable of discharging ink, various processing fluids, etc. to a recording medium and a method of conducting recording utilizing the device. The recording medium means an article to which ink or various processing fluids can be attached even temporarily.

The recording device may further optionally include a device relating to feeding, conveying, and ejecting the recording medium and other devices referred to as a pre-processing device, a post-processing device, etc. in addition to the head portion to discharge the ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with the ink. For example, the recording method and the recording device can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a wide device capable of printing images on a large recording medium such as A0 and a continuous printer capable of using continuous paper wound up in a roll form as recording media.

Figure 2:
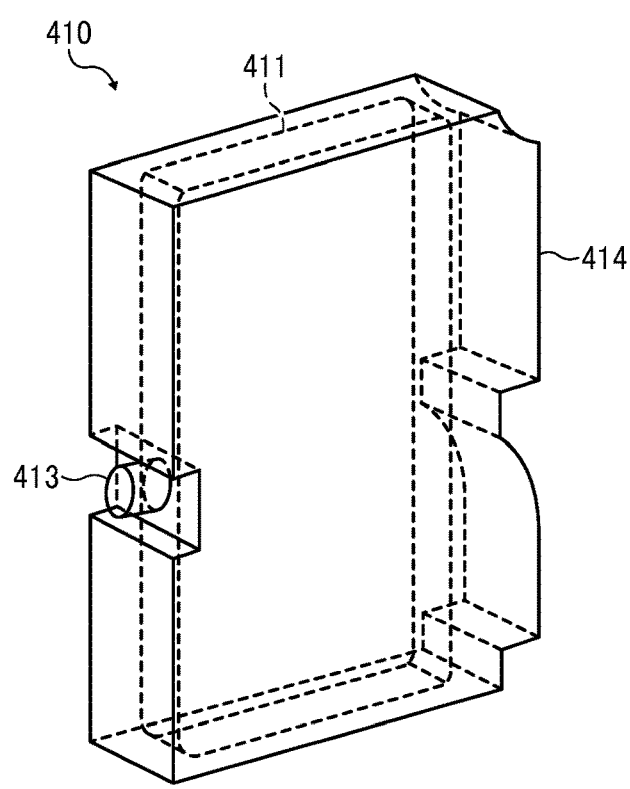
FIG. 2 is a diagram illustrating a perspective view of a main tank.

The device for recording (printing) device of the present disclosure is described using an example with reference to FIG. 1 and FIG. 2. Hereinafter, an example in which black (K), cyan (C), magenta (M), and yellow (Y) are used is described. It is suitable to use the ink of the present disclosure in place of or in addition to those.

FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member such as aluminum laminate film. The ink accommodating unit 411 is accommodated in, for example, a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

This recording device may include not only a portion to discharge ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

The drying temperature after recording on a recording medium with the ink of the present disclosure according to inkjet method is preferably 50 to 200 degrees C. In this temperature range, heat does not affect the recording medium.

The ink of the present disclosure obtains concealing property utilizing scattering of the shell of inorganic hollow particle and hollow portion inside in addition to scattering at the surface of particles as described above. Therefore, after applied film is dried, if the components of water-soluble organic solvent, etc. remain in the inorganic hollow particle, the concealing property of the applied film deteriorates. Whereas the ink of the present disclosure can be dried quickly at high temperatures since the hollow particle is formed of inorganic materials so that it has better chemical resistance during drying at high temperatures in comparison with the hollow resin particle.

The ink of the present disclosure satisfies the following relation:

$-10 \leq \Delta L^* = (L^*100 \text{ degrees C.}) - (L^*50 \text{ degrees C.}) \leq 10$, where $L^*50$ degrees C. and $L^*100$ degrees C. respectively represent $L^*$ of a solid image of 50 mm×50 mm with the ink formed on a polyethylene terephthalate (PET) film after the solid image is dried in a constant temperature tank at 50 degrees C. and 100 degrees C. for one hour. Images formed of the ink of the present disclosure have a good stability (for example, whiteness).

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for manufacturing a solid freeform fabrication to fabricate a three-dimensional solid object can be any known device with no particular limit. For example, the apparatus includes an ink container, a supplying device, and a discharging device, a drier, etc. The three-dimensional solid object includes an object manufactured by repeated ink coating. In addition, the three-dimensional solid object can be manufactured by processing a structure having a substrate such as a print medium to which the ink is applied as a molded processed product. The molded processed product is fabricated from printed matter or a structure having a sheet-like form, film-like form, etc. by, for example, heating drawing or punching.

The molded processed product is suitably used for articles which are molded after surface-decorating. Examples thereof are gauges or operation panels of vehicles, office machines, electric and electronic devices, cameras, etc.

Moreover, image forming, recording, printing, etc. in the present disclosure represent the same meaning.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Preparation of Wax Liquid Dispersion

1. Manufacturing Example of Inorganic Hollow Particle

The method of manufacturing the inorganic hollow particle for use in the present disclosure may be conventional technologies as described above. The manufacturing conditions for the inorganic hollow particle is shown in Table 1 and Manufacturing Example 3 is described below.

18.15 parts of calcium carbonate ("Shioenka" DD, particle form: cube, surface treating agent: rosin acid, primary particle diameter: 50 nm, manufactured by Shiraishi KK) was sufficiently dispersed in 181.54 parts of diglyme (dimethylene glycol dimethylether, manufactured by Kishida Chemical Co., Ltd.) in a beaker using a homogenizer (HG30, C20 cutter, 8,000 rpm, 30 minutes, manufactured by Hitachi Koki Co., Ltd.). Thereafter, keeping stirring while maintaining the dispersion state of calcium carbonate, 14.52 parts of tetraethoxy silane (TEOS) (KBE-04, manufactured by Shin-Etsu Chemical Co., Ltd.), 14.61 parts of 28 percent ammonium water ($NH_4OH$, manufactured by Wako Pure Chemical Industries, Ltd.), and 71.17 parts of water were admixed to conduct reaction at 25 degrees C. for four hours so that silica-coated particle was obtained having a silica shell on the surface of calcium carbonate utilizing sol-gel reaction.

Next, the thus-obtained silica-coated particle was rinsed and dispersed in water. Moreover, acetic acid diluted 10 times was added to dissolve calcium carbonate as the core particle. pH was 4.0 after the addition of acetic acid. Thereafter, for desalting, the resultant was rinsed with water using ultrafiltration membrane. Thus, concentrated article [18 percent by mass water layer of inorganic hollow particle 3] was obtained. In each rinsing process, liquid-liquid replacement was conducted to avoid agglomeration that may occur during drying of the silica coated particle or inorganic hollow particle.

Similarly, under the condition of each Manufacturing Example shown in Table 1, [18 percent by mass water layer of inorganic hollow particle 1], [18 percent by mass water layer of inorganic hollow particle 2], and [18 percent by mass water layer of inorganic hollow particle 4] to [18 percent by mass water layer of inorganic hollow particle 15] were obtained. In Manufacturing Example 14, marketed product SiliNax (outer diameter: 100 nm, inner diameter: 80 nm, water-dispersion type, manufactured by Nittetsu Mining Co., Ltd.) was used as the inorganic hollow particle.

The details of the calcium carbonate shown in Table 1 were as follows.

"Viscal" (particle form: cube, surface treating agent: none, primary particle diameter: 80 nm, manufactured by "New Lime")

Brilliant-1500 (particle form: cube, surface treating agent: none, primary particle diameter: 150 nm, manufactured by Shiraishi KK)

Homocal-D (particle form: cube, surface treating agent: rosin acid, primary particle diameter: 80 nm, manufactured by Shiraishi KK)

Homocal-DM (particle form: cube, surface treating agent: rosin acid, primary particle diameter: 80 nm, manufactured by Shiraishi KK)

TABLE 1

| | Core particle (Calcium carbonate, cube) | | | | Solvent | | Water |
|---|---|---|---|---|---|---|---|
| | Kind | Surface treatment | Primary particle diameter | Addition amount | Kind | Addition amount | Addition amount |
| Manufacturing Example 1 | Viscal | None | 80 nm | 18.15 g | Ethanol | 181.54 g | 85.41 g |

TABLE 1-continued

| | | | | | | | |
|---|---|---|---|---|---|---|---|
| Manufacturing Example 2 | Brilliant-1500 | None | 150 nm | 18.15 g | Ethanol | 181.54 g | 81.69 g |
| Manufacturing Example 3 | "Shiroenka" DD | Rosin acid | 50 nm | 18.15 g | Diglyme | 181.54 g | 81.69 g |
| Manufacturing Example 4 | "Shiroenka" DD | Rosin acid | 50 nm | 18.15 g | Methanol | 181.54 g | 77.98 g |
| Manufacturing Example 5 | Homcal-D | Rosin acid | 80 nm | 18.15 g | Methanol | 181.54 g | 81.69 g |
| Manufacturing Example 6 | Homcal-D | Rosin acid | 80 nm | 18.15 g | Diglyme | 181.54 g | 81.69 g |
| Manufacturing Example 7 | Homcal-D | Rosin acid | 80 nm | 18.15 g | Methanol | 181.54 g | 77.98 g |
| Manufacturing Example 8 | Brilliant-1500 | None | 150 nm | 18.15 g | Methanol | 181.54 g | 77.98 g |
| Manufacturing Example 9 | Homcal-DM | Rosin acid | 80 nm | 18.15 g | Ethanol | 181.54 g | 81.69 g |
| Manufacturing Example 10 | Homcal-DM | Rosin acid | 80 nm | 18.15 g | Diglyme | 181.54 g | 81.69 g |
| Manufacturing Example 11 | Homcal-DM | Rosin acid | 80 nm | 18.15 g | Methanol | 181.54 g | 77.98 g |
| Manufacturing Example 12 | Homcal-D | Rosin acid | 80 nm | 18.15 g | Diglyme | 181.54 g | 85.41 g |
| Manufacturing Example 13 | Viscal | None | 80 nm | 18.15 g | Ethanol | 181.54 g | 85.41 g |
| Manufacturing Example 14 | Product available on the market | | | | | | |
| Manufacturing Example 15 | Brilliant-1500 | None | 150 nm | 18.15 g | Ethanol | 181.54 g | 77.98 g |

| | Silicone alkoxide | | Catalyst | | Reaction | | pH after acid addition |
|---|---|---|---|---|---|---|---|
| | Kind | Addition amount | Kind | Addition amount of $NH_3$ | Temperature | Time | |
| Manufacturing Example 1 | TEOS | 11.62 g | $NH_4F$ | 3.27 g | 25 degrees C. | 4 h | 5.5 |
| Manufacturing Example 2 | TEOS | 14.52 g | $NH_4OH$ | 4.09 g | 25 degrees C. | 4 h | 5.0 |
| Manufacturing Example 3 | TEOS | 14.52 g | $NH_4OH$ | 4.09 g | 25 degrees C. | 4 h | 4.0 |
| Manufacturing Example 4 | TEOS | 17.42 g | $NH_4F$ | 4.91 g | 25 degrees C. | 12 h | 4.0 |
| Manufacturing Example 5 | TEOS | 14.52 g | $NH_4OH$ | 4.09 g | 25 degrees C. | 2 h | 4.0 |
| Manufacturing Example 6 | TEOS | 14.52 g | $NH_4OH$ | 4.09 g | 25 degrees C. | 12 h | 4.0 |
| Manufacturing Example 7 | TEOS | 17.42 g | $NH_4OH$ | 4.91 g | 25 degrees C. | 6 h | 4.5 |
| Manufacturing Example 8 | TEOS | 17.42 g | $NH_4OH$ | 4.91 g | 25 degrees C. | 12 h | 5.5 |
| Manufacturing Example 9 | TEOS | 14.52 g | $NH_4OH$ | 4.09 g | 25 degrees C. | 4 h | 5.0 |
| Manufacturing Example 10 | TEOS | 14.52 g | $NH_4OH$ | 4.09 g | 25 degrees C. | 4 h | 5.6 |
| Manufacturing Example 11 | TEOS | 17.42 g | $NH_4F$ | 4.91 g | 25 degrees C. | 12 h | 5.8 |
| Manufacturing Example 12 | TEOS | 11.62 g | $NH_4F$ | 3.27 g | 25 degrees C. | 1 h | 2.0 |
| Manufacturing Example 13 | TEOS | 11.62 g | $NH_4F$ | 3.27 g | 25 degrees C. | 1 h | 6.0 |
| Manufacturing Example 14 | Product available on the market | | | | | | |
| Manufacturing Example 15 | TEOS | 17.42 g | $NH_4OH$ | 4.91 g | 25 degrees C. | 24 h | 2.0 |

2. Manufacturing Example of Water Dispersion of Inorganic Hollow Particle and Liquid Dispersions 1 to 15 of Inorganic Hollow Particle To 100 parts of [18 percent by mass water layer of inorganic hollow particle 3], 6 parts of acrylic block copolymer having an amino group (dispersant, BYKJET-9151, acid value: 8 mgKOH/g, amine value: 18 mgKOH/g, effective component: 100 percent by mass, manufactured by Byc Chemie Japan Co., Ltd.) and 14 parts of water were added. Subsequent to sufficient stirring, the mixture was subject to dispersion using a media-free device (NVC-ES008, 150 μm collision type nozzle, discharging pressure: 50 MPa, number of pass: 10 times, manufactured by Yoshida kikai co., ltd.). The thus-obtained liquid dispersion was filtrated by a membrane filter of 5 μm (cellulose acetate membrane) to prepare [Liquid dispersion 3 of inorganic hollow particle] (particle concentration: 15 percent by mass).

Similarly, using [18 percent by mass water layer of inorganic hollow particle 1], [18 percent by mass water layer of inorganic hollow particle 2], [18 percent by mass water layer of inorganic hollow particle 4] to [18 percent by mass water layer of inorganic hollow particle 13], and [18 percent by mass water layer of inorganic hollow particle 15], [Liquid dispersion 1 of inorganic hollow particle], [Liquid dispersion 2 of inorganic hollow particle], [Liquid dispersion 4 of inorganic hollow particle] to [Liquid dispersion 13 of inorganic hollow particle], and [Liquid dispersion 15] of inorganic hollow particle] were prepared.

In addition, [Liquid dispersion 14 of inorganic hollow particle] was prepared using the marketed product SiliNax prepared to have a concentration of solid portion of 15 percent by mass as the inorganic hollow particle.

3. Manufacturing Example of Water Dispersion of Inorganic Hollow Particle and Liquid Dispersion 16 of Inorganic Hollow Particle The solvent of [18 percent by mass water layer of inorganic hollow particle 6] obtained in 1 was substituted with γ-butylolactone. Moreover, 50 percent by mass synergist (Solsperse 12000, manufactured by The Lubrizol Corporation) was added to the inorganic hollow particle 6 and the mixture was dispersed by a homogenizer (HG30, C20 cutter, 8,000 rpm, 60 minutes, manufactured by Hitachi Koki Co., Ltd.) while being cooled down by water.

The thus-obtained solvent-based liquid dispersion of the inorganic hollow particle 6 was filtrated by a membrane filter of 5 μm to prepare [Liquid dispersion 16 of inorganic hollow particle] (particle concentration: 15.0 percent by mass).

4. Manufacturing of Liquid Dispersion of Hollow Resin Particle

The following recipe was mixed and stirred.

Ethylene glycol dimethacrylate (BLEMMER® PDE-50R, number of polyoxyethylene units: 1, manufactured by NOF CORPORATION) as polymerizable monomer: 25 parts trimethylol propane trimethacrylate (SR351S, manufactured by Sartomer Company): 50 parts acrylonitrile: 25 parts toluene as non-polymerizable compound: 95 parts hexadecane: 5 parts azobisisobutylonitril: 1 part The thus-obtained liquid mixture was all added to 2 percent by mass sodium dodecylbenzenesulfonate as water-soluble emulsifier and 1,600 parts of deionized water including 1 percent by mass cetyl alcohol as dispersion helping agent followed by forcible emulsification by an ultrasonic homogenizer for 60 minutes to prepare a liquid dispersion in which polymerizable liquid droplets were dispersed.

Thereafter, a polymerization vessel of 20 L equipped with a stirrer, a jacket, a reflux condenser, and a thermometer was decompressed followed by deoxidization in the vessel. The pressure was returned to atmosphere pressure by nitrogen gas so that the inside of the polymerization vessel was in nitrogen atmosphere. Into this polymerization vessel, all of the thus-obtained liquid dispersion was charged at once and thereafter the vessel was heated to 60 degrees C. to initiate polymerization. After polymerization for four hours, the polymerizable vessel was cooled down to room temperature to obtain microcapsule slurry including non-polymerizable compound. Thus-obtained slurry was dried using a spry drier to prepare hollow particulates.

The thus-obtained hollow particulate was observed with a transmission electron microscope (JEM-1200 EXII, manufactured by JEOL Ltd.). The form was almost spherical and the average particle diameter was 0.12 μm. In addition, the thus-obtained hollow particulate had a structure including a single hollow portion inside and the ratio of the shell portion was 50 percent by volume.

5 parts of acrylic block copolymer including an amine group (dispersant, BYKJET-9151, acid value: 8 mgKOH/g, amine value: 18 mgKOH/g, effective component: 100 percent by mass, manufactured by Byc Chemie Japan Co., Ltd.) was caused to be dissolved in 80 parts of water. 15 parts of the thus-obtained hollow particulate was added and the mixture was sufficiently added. Thereafter, 80 parts of zirconia ball having a diameter of 2 mm was added thereto followed by dispersion for two days by a ball mill under the following condition. The thus-obtained liquid dispersion was filtrated by a membrane filter (PTFE membrane) of 5 μm to prepare [Liquid dispersion of hollow resin particle] (particle concentration: 15 percent by mass).

Condition of Ball Mill

Media: YTZ ball diameter of 5 mm
    (Zirconia ball, manufactured by NIKKATO CORPORATION)
    YTZ ball diameter of 1 mm
    (Zirconia ball, manufactured by NIKKATO CORPORATION)

Mill: MIX-ROTA VMR-5 (manufactured by AS ONE Corporation)

Number of rotation: 75 rpm (number of rotation of mayonnaise bottle)

5. Preparation of Liquid Dispersion of Titanium Oxide 18.0 parts of acrylic copolymer (dispersant, DISPER-BYK-2008, amine value: 66 mgKOH/g, effective component: 100 percent by mass, manufactured by Byc Chemie Japan Co., Ltd.) was dissolved in 67.0 parts of highly-pure water in a beaker. 15.0 parts of titanium dioxide (JR-600A, primary particle diameter: 250 nm, surface treatment: A1, manufactured by TAYCA CORPORATION) was added thereto. While being cooled down with water, the mixture was dispersed by a homogenizer (HG30, C20 cutter, 8,000 rpm, 60 minutes, manufactured by Hitachi Koki Co., Ltd.). The thus-obtained liquid dispersion of titanium dioxide was filtrated by a membrane filter of 5 μm (cellulose acetate membrane) to prepare [Liquid dispersion of titanium oxide] (particle concentration: 15.0 percent by mass).

Preparation of Ink

EXAMPLE 1

Liquid dispersion 1 of inorganic hollow particle (15 percent by mass): 53.3 parts
1,3-propane diol: 12 parts
1,5-pentane diol: 10 part
3-methoxy-3-methyl-1-butanol: 8 parts
Diethylene glycol monoethyl ether: 4 parts
Polyurethane resin emulsion (35 percent by mass): 8 parts
Surfactant: 0.1 parts
Defoaming agent: 0.5 parts
Preservatives and fungicides: 0.05 parts
pH regulator: 0.5 parts
Highly-pure water: 3.55 parts The ink having the composition specified above was prepared and filtrated by a membrane filter of 5 μm (cellulose acetate membrane) to obtain [Ink 1]

EXAMPLES 2 TO 15

[Ink 2] to [Ink 15] were obtained in the same manner as in [Ink 1] except that the liquid dispersion of inorganic hollow particle and the material composition ratio were changed as shown in Tables 2 and 3.

Comparative Examples 1 to 4

[Ink 16] to [Ink 19] were obtained in the same manner as in [Ink 1] except that the liquid dispersion of inorganic hollow particle and the material composition ratio were changed as shown in Table 4.

Comparative Examples 5 and 6

[Ink 20] and [Ink 21] were obtained in the same manner as in [Ink 1] except that the liquid dispersions of inorganic hollow particle were changed to the liquid dispersions of hollow resin particle specified above and the material composition ratio were changed as shown in Table 4.

Comparative Example 7

[Ink 22] was obtained in the same manner as in [Ink 1] except that the liquid dispersion of inorganic hollow particle was changed to the liquid dispersions of hollow resin particle specified above and the material composition ratio was changed as shown in Table 4.

Comparative Example 8

[Ink 23] was obtained in the same manner as in [Ink 1] except that the liquid dispersion of inorganic hollow particle was changed to the liquid dispersions of titanium oxide specified above and the material composition ratio was changed as shown in Table 4.

The 50 percent cumulative volume particle diameter (DSO), number average primary particle diameter, inner diameter, and shell thickness of the inorganic hollow particle were obtained. These can be obtained using transmission electron microscope (JEM-210F, manufactured by JEOL Ltd.) as described above. The measuring results are shown in Tables 2 to 4.

TABLE 2

| | | Example 1 | Example 2 | Example 3 | Example 4 | Example 5 |
|---|---|---|---|---|---|---|
| Liquid dispersion or coloring material | | Liquid dispersion 1 of inorganic hollow particle | Liquid dispersion 2 of inorganic hollow particle | Liquid dispersion 3 of inorganic hollow particle | Liquid dispersion 4 of inorganic hollow particle | Liquid dispersion 5 of inorganic hollow particle |
| Inorganic hollow particle | | Inorganic hollow particle 1 | Inorganic hollow particle 2 | Inorganic hollow particle 3 | Inorganic hollow particle 4 | Inorganic hollow particle 5 |
| | Primary particle diameter (Outer diameter) (nm) | 83 | 150 | 57 | 67 | 88 |
| | Inner diameter (nm) | 78 | 140 | 48 | 49 | 81 |
| | Shell thickness (nm) | 5 | 10 | 9 | 18 | 7 |
| | Ratio of inner diameter/outer diameter | 0.94 | 0.93 | 0.84 | 0.73 | 0.92 |
| | Ink | Ink 1 | Ink 2 | Ink 3 | Ink 4 | Ink 5 |
| Liquid dispersion or coloring material | | 53.3 | 53.3 | 53.3 | 53.3 | 53.3 |
| Aqueous ink | | | | | | |
| 1,3-propane diol | | 12 | | 10 | 12 | 12 |
| 1,2-butane diol | | | 12 | | | |
| 1,5-pentane diol | | 10 | | | | 10 |
| 1,6-hexane diol | | | 10 | | 10 | |
| 3-methoxy-3-methyl-1-butanol | | 8 | | 12 | | 8 |
| 2-ethyl-1,3-hexane diol | | | 7 | | 8 | |
| 3-methyl-1,3-butane diol | | | | 8 | | |
| Diethylene glycol monoethyl ether | | 4 | | 4 | | 4 |
| Diethylene glycol monoisobutyl ether | | | 5 | | 4 | |
| Amide compound | | | | | | |
| Glycerin | | | | | | |
| Polyurethane resin emulsion | | 8 | 8 | 8 | 8 | 8 |
| Surfactant | A | 0.1 | | 0.1 | 0.1 | |
| | M | | 0.1 | | | 0.1 |
| | P | | | | | |
| Defoaming agent | AD01 | 0.5 | 0.5 | 0.5 | 0.5 | 0.5 |
| Preservatives and fungicides | PROXEL LV | 0.05 | 0.05 | 0.05 | 0.05 | 0.05 |
| pH regulator | 1N—NaOH | 0.5 | 0.5 | 0.5 | 0.5 | 0.5 |
| | Water | 3.55 | 3.55 | 3.55 | 3.55 | 3.55 |

TABLE 2-continued

| Solvent ink | | | | | |
|---|---|---|---|---|---|
| Triethylene glycol monoethyl ether | | | | | |
| Propylene glycol mono-propyl ether | | | | | |
| Diethylene glycol mdiethyl ether | | | | | |
| γ-butylolactone | | | | | |
| 2-octanone | | | | | |
| Polyester resin emulsion | | | | | |
| Epoxifled soybean oil | | | | | |
| Dispersant | | | | | |
| Total | 100 | 100 | 100 | 100 | 100 |
| 50 percent cumulative volume average particle diameter in ink | 283 | 339 | 68 | 170 | 223 |

| | | Example 6 | Example 7 | Example 8 | Example 9 | Example 10 |
|---|---|---|---|---|---|---|
| Liquid dispersion or coloring material | | Liquid dispersion 6 of inorganic hollow particle | Liquid dispersion 5 of inorganic hollow particle | Liquid dispersion 6 of inorganic hollow particle | Liquid dispersion 5 of inorganic hollow particle | Liquid dispersion 16 of inorganic hollow particle |
| Inorganic hollow particle | | Inorganic hollow particle 6 | Inorganic hollow particle 5 | Inorganic hollow particle 6 | Inorganic hollow particle 5 | Inorganic hollow particle 6 |
| | Primary particle diameter (Outer diameter) (nm) | 92 | 88 | 92 | 88 | 92 |
| | Inner diameter (nm) | 79 | 81 | 79 | 81 | 79 |
| | Shell thickness (nm) | 13 | 7 | 13 | 7 | 13 |
| | Ratio of inner diameter/outer diameter | 0.86 | 0.92 | 0.86 | 0.92 | 0.86 |
| Ink | | Ink 6 | Ink 7 | Ink 8 | Ink 9 | Ink 10 |
| Liquid dispersion or coloring material | | 53.3 | 53.3 | 53.3 | 53.3 | 53.3 |
| Aqueous ink | | | | | | |
| 1,3-propane diol | | | 10 | 12 | 12.5 | |
| 1,2-butane diol | | 12 | | | | |
| 1,5-pentane diol | | | | | | |
| 1,6-hexane diol | | 10 | | 10 | | |
| 3-methoxy-3-methyl-1-butanol | | | 12 | | | |
| 2-ethyl-1,3-hexane diol | | 7 | | 8 | 12.5 | |
| 3-methyl-1,3-butane diol | | | 8 | | | |
| Diethylene glycol monoethyl ether | | | 4 | | | |
| Diethylene glycol monoisobutyl ether | | 5 | | 4 | | |
| Amide compound | | | | | 15 | |
| Glycerin | | | | | 2 | |
| Polyurethane resin emulsion | | 8 | 8 | 8 | | |
| Surfactant | A | | 0.1 | 0.1 | | |
| | M | 0.1 | | | | |
| | P | | | | 0.1 | |
| Defoaming agent | AD01 | 0.5 | 0.5 | 0.5 | 0.5 | |
| Preservatives and fungicides | PROXEL LV | 0.05 | 0.05 | 0.05 | 0.05 | |
| pH regulator | 1N—NaOH | 0.5 | 0.5 | 0.5 | 0.5 | |
| Water | | 3.55 | 3.55 | 3.55 | 3.55 | |
| Solvent ink | | | | | | |
| Triethylene glycol monoethyl ether | | | | | | 15 |
| Propylene glycol mono-propyl ether | | | | | | 8 |
| Diethylene glycol mdiethyl ether | | | | | | 8.7 |
| γ-butylolaetone | | | | | | 8 |
| 2-octanone | | | | | | 2 |

TABLE 2-continued

| | | | | | |
|---|---|---|---|---|---|
| Polyester resin emulsion | | | | | 3 |
| Epoxified soybean oil | | | | | 2 |
| Dispersant | | | | | |
| Total | 100 | 100 | 100 | 100 | 100 |
| 50 percent cumulative volume average particle diameter in ink | 257 | 235 | 260 | 212 | 251 |

TABLE 3

| | Example 11 | Example 12 | Example 13 | Example 14 | Example 15 |
|---|---|---|---|---|---|
| Liquid dispersion or coloring material | Liquid dispersion 7 of inorganic hollow particle | Liquid dispersion 8 of inorganic hollow particle | Liquid dispersion 9 of inorganic hollow particle | Liquid dispersion 10 of inorganic hollow particle | Liquid dispersion 11 of inorganic hollow particle |
| Inorganic hollow particle | Inorganic hollow particle 7 | Inorganic hollow particle 8 | Inorganic hollow particle 9 | Inorganic hollow particle 10 | Inorganic hollow particle 11 |
| Primary particle diameter (Outer diameter) (nm) | 94 | 153 | 93 | 92 | 91 |
| Inner diameter (nm) | 80 | 141 | 82 | 82 | 81 |
| Shell thickness (nm) | 14 | 12 | 11 | 10 | 10 |
| Ratio of inner diameter/outer diameter | 0.85 | 0.92 | 0.88 | 0.89 | 0.89 |
| Ink | Ink 11 | Ink 12 | Ink 13 | Ink 14 | Ink 15 |
| Liquid dispersion or coloring material | 53.3 | 53.3 | 53.3 | 53.3 | 53.3 |
| Aqueous ink | | | | | |
| 1,3-propane diol | | 12 | 12.5 | | 12.5 |
| 1,2-butane diol | 12 | | | 12 | |
| 1,5-pentane diol | | | | | |
| 1,6-hexane diol | 10 | 10 | | 10 | |
| 3-methoxy-3-methyl-1-butanol | | | | | |
| 2-ethyl-1,3-hexane diol | 7 | 8 | 12.5 | 7 | 12.5 |
| 3-methyl-1,3-butane diol | | | | | |
| Diethylene glycol monoethyl ether | | | | | |
| Diethylene glycol monoisobutyl ether | 5 | 4 | | 5 | |
| Amide compound | | | 15 | | 15 |
| Glycerin | | | 2 | | 2 |
| Polyurethane resin emulsion | 8 | 8 | | 8 | |
| Surfactant G | | 0.1 | | | |
| M | 0.1 | | | 0.1 | |
| P | | | 0.1 | | 0.1 |
| Defoaming agent AD01 | 0.5 | 0.5 | 0.5 | 0.5 | 0.5 |
| Preservatives and fungicides PROXEL LV | 0.05 | 0.05 | 0.05 | 0.05 | 0.05 |
| pH regulator 1N—NaOH | 0.5 | 0.5 | 0.5 | 0.5 | 0.5 |
| Water | 3.55 | 3.55 | 3.55 | 3.55 | 3.55 |
| Solvent ink | | | | | |
| Triethylene glycol monoethyl ether | | | | | |
| Propylene glycol mono-propyl ether | | | | | |
| Diethylene glycol mdiethyl ether | | | | | |
| γ-butylolactone | | | | | |
| 2-octanone | | | | | |
| Polyester resin emulsion | | | | | |
| Epoxified soybean oil | | | | | |
| Dispersant | | | | | |
| Total | 100 | 100 | 100 | 100 | 100 |
| 50 percent cumulative volume average particle diameter in ink | 230 | 350 | 180 | 185 | 190 |

TABLE 4

|  | Comparative Example 1 | Comparative Example 2 | Comparative Example 3 | Comparative Example 4 |
|---|---|---|---|---|
| Liquid dispersion or coloring material | Liquid dispersion 12 of inorganic hollow particle | Liquid dispersion 13 of inorganic hollow particle | Liquid dispersion 14 of inorganic hollow particle | Liquid dispersion 15 of inorganic hollow particle |
| Inorganic hollow particle | Inorganic hollow particle 12 | Inorganic hollow particle 13 | Product available on the market | Inorganic hollow particle 14 |
| Primary particle diameter (Outer diameter) (nm) | 81 | 86 | 92 | 172 |
| Inner diameter (nm) | 78 | 83 | 84 | 154 |
| Shell thickness (nm) | 3 | 3 | 12 | 18 |
| Ratio of inner diameter/outer diameter | 0.96 | 0.97 | 0.91 | 0.90 |
| Ink | Ink 16 | Ink 17 | Ink 18 | Ink 19 |
| Liquid dispersion or coloring material | 53.3 | 53.3 | 8 | 53.3 |
| Aqueous ink | | | | |
| 1,3-propane diol | 12 | | 10 | 12 |
| 1,2-butane diol | | 12 | | |
| 1,5-pentane diol | 10 | | | |
| 1,6-hexane diol | | 10 | | 10 |
| 3-methoxy-3-methyl-1-butanol | 8 | | 12 | |
| 2-ethyl-1,3-hexane diol | | 7 | | 8 |
| 3-methyl-1,3-butane diol | | | 8 | |
| Diethylene glycol monoethyl ether | 4 | | 4 | |
| Diethylene glycol monoisobutyl ether | | 5 | | 4 |
| Amide compound | | | | |
| Glycerin | | | | |
| Polyurethane resin emulsion | 8 | 8 | 8 | 8 |
| Surfactant G | 0.1 | 0.1 | | |
| M | | | 0.1 | 0.1 |
| P | | | | |
| Defoaming agent AD01 | 0.5 | 0.5 | 0.5 | 0.5 |
| Preservatives and fungicides PROXEL LV | 0.05 | 0.05 | 0.05 | 0.05 |
| pH regulator 1N—NaOH | 0.5 | 0.5 | 0.5 | 0.5 |
| Water | 3.55 | 3.55 | 48.85 | 3.55 |
| Solvent ink | | | | |
| Triethylene glycol monoethyl ether | | | | |
| Propylene glycol mono-propyl ether | | | | |
| Diethylene glycol mdiethyl ether | | | | |
| γ-butylolactone | | | | |
| 2-octanone | | | | |
| Polyester resin emulsion | | | | |
| Epoxified soybean oil | | | | |
| Dispersant | | | | |
| Total | 100 | 100 | 100 | 100 |
| 50 percent cumulative volume average particle diameter in ink | 364 | 173 | 620 | 410 |

|  | Comparative Example 5 | Comparative Example 6 | Comparative Example 7 | Comparative Example 8 |
|---|---|---|---|---|
| Liquid dispersion or coloring material | Hollow resin particle Liquid dispersion | Hollow resin particle Liquid dispersion | Hollow resin particle | Liquid dispersion of titanium oxide |
| Inorganic hollow particle | — | — | — | — |

TABLE 4-continued

| | | Ink 20 | Ink 21 | Ink 22 | Ink 23 |
|---|---|---|---|---|---|
| Primary particle diameter (Outer diameter) (nm) | | — | — | — | — |
| Inner diameter (nm) | | — | — | — | — |
| Shell thickness (nm) | | — | — | — | — |
| Ratio of inner diameter/outer diameter | | — | — | — | — |
| Ink | | Ink 20 | Ink 21 | Ink 22 | Ink 23 |
| Liquid dispersion or coloring material | | 53.3 | 53.3 | 8 | 53.3 |
| Aqueous ink | | | | | |
| 1,3-propane diol | | 11 | 12.5 | | 10 |
| 1,2-butane diol | | | | | |
| 1,5-pentane diol | | | | | |
| 1,6-hexane diol | | 11 | | | |
| 3-methoxy-3-methyl-1-butanol | | 8 | | | 12 |
| 2-ethyl-1,3-hexane diol | | | 12.5 | | |
| 3-methyl-1,3-butane diol | | | | | 8 |
| Diethylene glycol monoethyl ether | | 4 | | | 4 |
| Diethylene glycol monoisobutyl ether | | | | | |
| Amide compound | | | 15 | | |
| Glycerin | | | 2 | | |
| Polyurethane resin emulsion | | 8 | | | 8 |
| Surfactant | G | 0.1 | | | 0.1 |
| | M | | | | |
| | P | | 0.1 | | |
| Defoaming agent | AD01 | 0.5 | 0.5 | | 0.5 |
| Preservatives and fungicides | PROXEL LV | 0.05 | 0.05 | | 0.05 |
| pH regulator | 1N—NaOH | 0.5 | 0.5 | | 0.5 |
| | Water | 3.55 | 3.55 | | 3.55 |
| Solvent ink | | | | | |
| Triethylene glycol monoethyl ether | | | | 25 | |
| Propylene glycol mono-propyl ether | | | | 8 | |
| Diethylene glycol mdiethyl ether | | | | 18 | |
| γ-butylolactone | | | | 30 | |
| 2-octanone | | | | 2 | |
| Polyester resin emulsion | | | | 3 | |
| Epoxified soybean oil | | | | 2 | |
| Dispersant | | | | 4 | |
| Total | | 100 | 100 | 100 | 100 |
| 50 percent cumulative volume average particle diameter in ink | | 192 | 195 | 180 | 330 |

In Tables 2 to 4, the materials used are as follows:

Aqueous ink 1,3-propane diol (boiling point: 188 degrees C.)
1,2-butane diol (boiling point: 195 degrees C.)
1,5-pentane diol (boiling point: 242 degrees C.)
1,6-hexane diol (boiling point: 223 degrees C.)
3-methoxy-3-methyl-1-butanol (boiling point: 174 degrees C.)
2-ethyl-1,3-hexane diol (boiling point: 244 degrees C.)
3-methyl-1,3-butane diol (boiling point: 204 degrees C.)
Diethylene glycol monoethyl ether (boiling point: 194 degrees C.)
Diethylene glycol monobutyl ether (boiling point: 220 degrees C.)
Amide compound having the following structure: R=CH$_3$ (Equamide™ M100, boiling point: 216 degrees C., manufactured by Idemitsu Kosan Co., Ltd.)

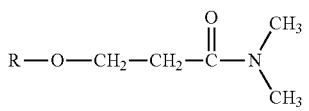

Glycerin (boiling point: 290 degrees C.)
Polyurethane resin emulsion (W-5661, solid portion 35 percent, manufactured by Mitsui Takeda Chemicals Inc.)
Surfactant A: polyoxyethylene alkylene derivative (Dispanol® TOC, manufactured by NOF CORPORATION)
Surfactant B: Polyoxyethylene styrene phenylether (NOIGEN EA-177, manufactured by DAI-ICHI KOGYO SEIYAKU CO., LTD.)
Surfactant C: fluorochemical surfactant (Polyfox, manufactured by OMNOVA)

Defoaming agent (EMBIROGEM® AD-01)
Preservatives and fungicides (PROXEL LV)
pH Regulator: 1N—NaOH
Solvent Ink
Triethylene glycol monoethyl ether (boiling point: 248 degrees C.)
Propylene glycol mono-propyl ether (boiling point: 149 degrees C.)
Diethylene glycol diethylether (boiling point: 188 degrees C.)
γ-butylolactone (boiling point: 204 degrees C.)
2-octanone (boiling point: 173 degrees C.)
Polyester resin emulsion: PESRESIN S-100EA, manufactured by TAKAMATSU OIL & FAT CO., LTD.
Epoxified soybean oil dispersant: Soybean oil 5000 (manufactured by The Lubrizol Corporation)

The obtained ink were evaluated as follows:

Quantification Evaluation of Calcium Ion in Ink

Calcium ion in the ink prepared in Examples 1 to 15 and Comparative Examples 1 to 4 was quantified by using Inductively Coupled Plasma (ICP) emission spectrometer (ICPE-9000, manufactured by Shimadzu Corporation) to make evaluation according to the following evaluation criteria.

Evaluation Criteria

AA: Proportion of calcium ion in ink is less than 0.5 ppm
A: Proportion of calcium ion in ink is from 0.5 to 30 ppm
B: Proportion of calcium ion in ink is from greater than 30 to 50 ppm
C: Proportion of calcium ion in ink is from greater than 50 to 250 ppm
D: Proportion of calcium ion in ink surpasses 250 ppm Evaluation on Sedimentation of Ink Sedimentation property of the particle of the ink prepared in Examples 1 to 15 and Comparative Examples 1 to 8 was evaluated using turbiscan (MA2000, manufactured by EKO Instruments).

Specifically, while cooling down the ink to be evaluated, the ink was subject to ultrasonic dispersion treatment (100w, 20 minutes) for uniform dispersion. Thereafter, 5.0 mL of the ink to be evaluated was charged in a special glass cell using a pipette. 30 minutes later at which the liquid level of the ink was stabilized, the measuring was conducted. This point in time was determined as the start of sedimentation evaluation. Thereafter, the ink was left still at 23 degrees C. and kept measured until 150 hours later. Sedimentation was evaluated and indicated by deviation display determining the start of sedimentation evaluation as reference. Sedimentation was conducted by quantity survey (relative value mode) of the peaks representing changes of backscattered light ascribable to production of supernatent and evaluated according to the following criteria:

Evaluation Criteria

A: Relative change 150 hours after the start of evaluation was less than 5 percent
B: Relative change 150 hours after the start of evaluation was from 5 to less than 10 percent
C: Relative change 150 hours after the start of evaluation was 10 percent or greater Ink Storage Stability An ink cartridge was filled with the ink prepared in Examples 1 to 15 and Comparative Examples 1 to 8, and stored at 65 degrees C. for three weeks. Using a cone plate type rotatory viscometer (VISCOMETER TV-22, manufactured by TOKI SANGYO CO., LTD.), viscosity was measured before and after the storage in the conditions of the temperature of constant temperature circulating water of 25 degrees C., the rotation number of 50 rpm, and the shearing speed of 191.4 sec$^{-1}$ and evaluated according to the following criteria.

Evaluation Criteria

A. Change rate of viscosity before and after storage within −5 percent to 5 percent
B: Change rate of viscosity before and after storage within −10 percent to less than −5 percent and more than 5 percent to 10 percent
C: Change rate of viscosity before and after storage within −15 percent to less than −10 percent and more than 10 percent to 15 percent
D: Change rate of viscosity before and after storage less than −15 percent or more than 15 percent Print Condition The exterior of an inkjet printer (IPSiOGXe5500, manufactured by Ricoh Company Ltd.) was removed and multiple bypass feeders were attached on the rear side. Pure water was caused to sufficiently flow in the ink supplying passage including the print head until the washing liquid was not colored. Thereafter, the washing liquid was completely removed from the device for evaluation.

In addition, the prepared ink was stirred for 30 minutes under a reduced pressure of 5 to 10 Pa to remove air from the ink to be evaluated. An ink cartridge was filled with the ink to make an ink for evaluation. After conducting filling operation and confirming that all the nozzles were filled with the ink to be evaluated and no defective images were produced, gloss and beautiful mode was selected by a driver installed onto the printer and thereafter color matching off was determined as print mode at user setting. The discharging amount was controlled by changing the drive voltage of the head in order that the attached amount of the ink of a solid image on a medium was 20 g/m$^2$.

Evaluation on Concealing Property

Luminosity Evaluation of Print Image

An inkjet printer (IPSiOGXe5500, manufactured by Ricoh Company Ltd.) was filled with the ink prepared in Examples 1 to 15 and Comparative Examples 1 to 8 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried in a constant temperature tank at 50 degrees C. for one hour.

Placing a black sheet available on the market under the PET film on which the solid image was printed, the luminosity (L*) of the printed portion was measured using a spectrophotometer (X-Rite 939, manufactured by X-Rite) and evaluated according to the following evaluation criteria.

Evaluation Criteria

A: L* value is 70 or greater
B: L* value is 60 to less than 70
A: L* value is less than 60.

As reference, the L* value was measured while a PET film having no printing thereon was placed on black paper. It was 23.

Whiteness Stability of Print Image

An inkjet printer (IPSiOGXe5500, manufactured by Ricoh Company Ltd.) was filled with the ink prepared in Examples 1 to 15 and Comparative Examples 1 to 8 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape.

Thereafter, luminosity of the recording medium dried in a constant temperature tank at 50 degrees C. for one hour and the recording medium dried in a constant temperature tank at 100 degrees C. for one hour was measured. The absolute value of the luminosity difference ΔL* (L*100 degrees C.)–(L*50 degrees C.) was calculated and evaluated.

Placing a black sheet available on the market under the PET film on which the solid image was printed, the printed portion was measured using a spectrophotometer (X-Rite 939, manufactured by X-Rite) and evaluated according to the following evaluation criteria.

Evaluation Criteria
A: |ΔL*| value is less than 5.
B: |ΔL*| value is 5 to less than 10
C: |ΔL*| value is 10 or greater Luminosity Evaluation of Print Image (Temperature Dependency)

An inkjet printer (IPSiOGXe5500, manufactured by Ricoh Company Ltd.) was filled with the ink prepared in Example 9 and Comparative Example 6 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape.

Luminosity L* was measured for the recording medium dried in a constant temperature tank at 50 degrees C. for one hour, the recording medium dried in a constant temperature tank at 100 degrees C. for one hour, and the recording medium dried in a constant temperature tank at 150 degrees C. for one hour and evaluated according to the following criteria.

Evaluation Criteria
A: L* value is 70 or greater
B: L* value is 60 to less than 70
A: L* value is less than 60.

The results are shown in Table 8.

Evaluation on Chemical Resistance

An inkjet printer (IPSiOGXe5500, manufactured by Ricoh Company Ltd.) was filled with the ink prepared in Examples 1 to 9, Examples 11 to 15, Comparative Examples 1 to 6, and Comparative Example 8 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried in a constant temperature tank at 100 degrees C. for one hour.

The solid image portion was abraded by a cotton applicator impregnated in an aqueous solution including 49 percent of ethanol and 1 percent methylethyl ketone 20 times. The degree of peeling-off of the film of the solid image was evaluated according to the following criteria.

Evaluation Criteria
A: No peeling-off in solid image portion, no contamination on cotton applicator
B: No peeling-off in solid image portion but slight contamination observed on cotton applicator
C: Ink melted portion observed on solid image portion
D: Ink on solid image portion peeled off and PET film at least partially exposed Discharging Stability An inkjet printer (IPSIO GXe5500, manufactured by Ricoh Co., Ltd.) having a cover was filled with the ink prepared in Examples 1 to 15 and Comparative Examples 1 to 8 and left at 10 degrees C. and 15 percent RH for one week with the cover closed. Thereafter, a nozzle checking pattern was printed and visually observed to check non-discharging and disturbance of discharging for evaluation according to the following evaluation criteria.

Evaluation Criteria
A: No non-discharging or no disturbance at all
B: Slight discharging disturbance
C: One or more nozzles failed to discharge
D: Multiple nozzles failed to discharge The evaluation results of the aqueous ink are shown in Tables 5 and 6 and the evaluation results of the solvent ink are shown in Table 7

TABLE 5

|  | $Ca^{2+}$ ion | | Evaluation on sedimentation | | Ink storage stability |
|---|---|---|---|---|---|
|  | ppm | Rating | Relative change | Rating | Rating |
| Example 1 | 35 | M | 5.6 | M | M |
| Example 2 | 15 | G | 8.5 | M | M |
| Example 3 | 2 | A | 5.2 | M | A |
| Example 4 | 8 | A | 1.3 | A | A |
| Example 5 | 0.5 | A | 2.2 | A | A |
| Example 6 | 0.5 | A | 2.8 | A | A |
| Example 7 | 1 | A | 2.4 | A | A |
| Example 8 | 1 | A | 2.9 | A | A |
| Example 9 | 6 | A | 2.1 | A | A |
| Example 11 | 30 | A | 2.6 | A | B |
| Example 12 | 50 | B | 9.9 | B | B |
| Example 13 | 55 | C | 1.9 | A | B |
| Example 14 | 200 | C | 1.6 | A | C |
| Example 15 | 250 | C | 2.2 | A | C |

TABLE 5-continued

|  | Evaluation on concealing property | | | | | Chemical resistance Rating | Discharging stability Rating |
|---|---|---|---|---|---|---|---|
|  | Luminosity | | Luminosity stability | | | | |
|  | L*50 degrees C. | Rating | L*100 degrees C. | ⊿L* | Rating | | |
| Example 1 | 73 | G | 73 | 0 | G | G | G |
| Example 2 | 74 | G | 73 | −1 | G | G | G |
| Example 3 | 70 | A | 71 | 1 | A | A | A |
| Example 4 | 69 | B | 69 | 0 | A | A | A |
| Example 5 | 73 | A | 72 | −1 | A | A | A |
| Example 6 | 72 | A | 71 | −1 | A | A | A |
| Example 7 | 73 | A | 72 | −1 | A | A | A |
| Example 8 | 74 | A | 71 | −3 | A | A | A |
| Example 9 | 66 | B | 69 | 3 | A | A | A |
| Example 11 | 73 | A | 73 | 0 | A | A | A |
| Example 12 | 74 | A | 75 | 1 | A | A | A |
| Example 13 | 69 | B | 69 | 0 | A | A | B |
| Example 14 | 69 | B | 69 | 0 | A | A | B |
| Example 15 | 68 | B | 69 | 1 | A | A | B |

TABLE 6

|  | $Ca^{2+}$ ion | | Evaluation on sedimentation | | Ink storage stability Rating |
|---|---|---|---|---|---|
|  | ppm | Rating | Relative change | Rating | |
| Comparative Example 1 | 0.5 | A | 12 | C | B |
| Comparative Example 2 | 255 | D | 2.9 | A | D |
| Comparative Example 3 | 0.1 | AA | 15 | C | D |
| Comparative Example 4 | 0.5 | A | 14 | C | B |
| Comparative Example 5 | — | — | 2.4 | A | D |
| Comparative Example 6 | — | — | 2.1 | A | D |
| Comparative Example 8 | — | — | 18 | C | A |

|  | Evaluation on concealing property | | | | | Chemical resistance Rating | Discharging stability Rating |
|---|---|---|---|---|---|---|---|
|  | Luminosity | | Luminosity stability | | | | |
|  | L*50 degrees C. | Rating | L*100 degrees C. | ⊿L* | Rating | | |
| Comparative Example 1 | 75 | G | 73 | −2 | A | A | C |
| Comparative Example 2 | 73 | A | 73 | 0 | A | A | C |
| Comparative Example 3 | 74 | A | 73 | −1 | A | A | D |
| Comparative Example 4 | 76 | A | 75 | −1 | A | B | C |
| Comparative Example 5 | 68 | B | 42 | −26 | C | C | A |
| Comparative Example 6 | 63 | B | 37 | −26 | C | C | A |
| Comparative Example 8 | 69 | B | 70 | 1 | A | A | D |

TABLE 7

|  | Evaluation on sedimentation | | Evaluation on sedimentation | | Ink storage stability Rating |
|---|---|---|---|---|---|
|  | $Ca^{2+}$ ion | | Relative change | | |
|  | ppm | Rating | | Rating | |
| Example 10 | 1 | A | 3.8 | A | B |
| Comparative Example 7 | — | | 2.8 | A | D |

| | Evaluation on concealing property | | | | |
|---|---|---|---|---|---|
| | Luminosity | | Luminosity stability | | |
| | L*50 degrees C. | Rating | L*100 degrees C. | ⊿L* Rating | Discharging stability Rating |
| Example 10 | 72 | A | 71 | −1 A | B |
| Comparative Example 7 | 60 | B | 34 | −26 C | D |

TABLE 8

| | Evaluation on concealing property (temperature dependency) | | | | | |
|---|---|---|---|---|---|---|
| | 50 degrees C. | Rating | 100 degrees C. | Rating | 150 degrees C. | Rating |
| Example 9 | 66 | B | 69 | B | 72 | A |
| Comparative Example 6 | 61 | B | 63 | B | 32 | C |

The ink including inorganic hollow particles having a 50 percent cumulative volume particle diameter (D50) of from 50 to 350 nm and calcium ion in an amount of from 0.5 to 250 ppm as in Examples 1 to 15 were evaluated good regarding sedimentation, concealing property, and chemical resistance.

Conversely, the ink having a 50 percent cumulative volume particle diameter (D50) of greater than 350 nm as easily settled out shown in Comparative Examples 1 and 4 even hollow particles were included. This is considered to be caused by an increase of the specific gravity on appearance due to bonding solvent between particles as a result of agglomeration of the primary particles of the inorganic hollow particles in the ink even though they are mall. In addition, as seen in the result of Comparative Example 2, when the proportion of calcium ion in the ink surpassed 250 ppm, deterioration of the storage stability was confirmed. The product available on the market of Comparative Example 3 greatly agglomerated, which leads to easy sedimentation.

Moreover, in Comparative Examples 5 and 6, hollow resin particles were used. This invited very poor whiteness stability on the concealing property evaluation. This is considered to be because when the ink components evaporated during drying, the easily-soluble components were condensed since the evaporation speed of the solvent having a high boiling point was slow, so that the resin backbone forming hollow portions was dissolved. The same was applied to the case of Comparative Example 7.

Moreover, since titanium oxide was used in Comparative Example 8, the specific gravity was large, which invites easy sedimentation. As in the case of Example 9 and Comparative Example 6, when a solvent having a high boiling point was included, the solvent component easily remained in hollow particles, which invited slightly low whiteness. However, it was confirmed that good whiteness was obtained in Example 9 by applying severe drying conditions.

According to the present disclosure, an ink is provided which has good dispersion stability, concealing property, and chemical resistance.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
a volatile solvent;
an inorganic hollow particle; and
a calcium ion,
wherein the calcium ion has a proportion of from 0.5 to 250 ppm in the ink and the inorganic hollow particle has a 50 percent cumulative particle diameter of from 50 to 350 nm.

2. The ink according to claim 1, wherein the calcium ion has a proportion of from 0.5 to 50 ppm in the ink.

3. The ink according to claim 2, wherein the calcium ion has a proportion of from 0.5 to 30 ppm in the ink.

4. The ink according to claim 1, wherein the volatile solvent includes a non-polymerizable solvent and has a boiling point of 260 degrees C. or lower.

5. The ink according to claim 1, wherein the volatile solvent includes water or a water-soluble organic solvent.

6. The ink according to claim 1, wherein the volatile solvent includes an organic solvent.

7. The ink according to claim 1, wherein the inorganic hollow particle has a shell thickness of from 4 to 20 nm.

8. The ink according to claim 1, wherein a luminous difference ΔL* of a solid image of 50 mm×50 mm of the ink formed on a polyethylene terephthalate (PET) film satisfies the following relations:

$$\Delta L^* = (L^*100 \text{ degrees C.}) - (L^*50 \text{ degrees C.})$$

$$-10 \leq \Delta L^* \leq 10$$

where L*50 degrees C. and L*100 degrees C. respectively represent luminous L* after the solid image is dried in a constant temperature tank at 50 degrees C. and 100 degrees C. for one hour.

9. The ink according to claim 1, wherein the ink does not contain a resin particle.

10. The ink according to claim 1, wherein the volatile solvent does not include water.

11. The ink according to claim 1, wherein the inorganic hollow particle has a 50 percent cumulative particle diameter of from 50 to 190 nm.

12. An inkjet recording method comprising:
jetting the ink of claim 1 to a recording medium; and
drying the ink at 50 to 200 degrees C.

13. An ink cartridge comprising:
a container; and
the ink of claim 1 accommodated in the container.

14. An image recording device comprising:
an ink cartridge accommodating the ink of claim 1; and
a recording head configured to discharge the ink.

* * * * *